United States Patent [19]

Henry

[11] Patent Number: 5,012,219

[45] Date of Patent: Apr. 30, 1991

[54] MESSAGE REMINDER ALERT FOR SELECTIVE CALL RECEIVER

[75] Inventor: Courtney S. Henry, Coconut Creek, Fla.

[73] Assignee: Motorola, Inc., Schaumburg, Ill.

[21] Appl. No.: 421,035

[22] Filed: Oct. 13, 1989

[51] Int. Cl.[5] .................... H04Q 1/30

[52] U.S. Cl. .................... 340/311.1; 340/825.44; 340/825.45; 340/825.48

[58] Field of Search .......... 340/311.1, 825.44–825.48, 340/328, 384 E, 384 R

[56] References Cited

U.S. PATENT DOCUMENTS

| | | | |
|---|---|---|---|
| 4,160,240 | 7/1979 | Partipilo | 340/311.1 |
| 4,701,759 | 10/1987 | Nadir et al. | 340/825.44 |
| 4,755,816 | 7/1988 | DeLuca | 340/311.1 |
| 4,796,024 | 1/1989 | Sakoh et al. | 340/311.1 |
| 4,821,021 | 4/1989 | Ide et al. | 340/311.1 |
| 4,868,561 | 9/1989 | Davis | 340/825.44 |

OTHER PUBLICATIONS

SilCom Memo-Page I, Telocator Magazine, Mar. 1984.

Motorola Dimension 1000 Binary GSC Radoi Pager Theory/Maintenance Manual, pp. 3 to 9, 2-1983.

Philips PG32A Alpha-Numeric Pager User's Guide, 12-1986, pp. 2, 12.

Motorola Director II SV Radio Pager Operating Instructions, May, 1989, pp. 5 through 9.

*Primary Examiner*—Donnie L. Crosland

*Attorney, Agent, or Firm*—Daniel R. Collopy; Vincent B. Ingrassia; William E. Koch

[57] ABSTRACT

A selective call receiver includes a message reminder alert controlled by a reminder switch and independent of the receipt of subsequent messages.

31 Claims, 3 Drawing Sheets

MESSAGE REMINDER ALERT FOR SELECTIVE CALL RECEIVER

FIELD OF THE INVENTION

This invention relates generally to electronic devices capable of receiving and storing messages such as selective call receivers and, more specifically, to a selective call receiver having a message reminder alert.

BACKGROUND OF THE INVENTION

Electronic devices such as selective call receivers including pagers typically have the ability to receive, store, and review a plurality of information messages. Depending on the particular type of pager, the information messages may comprise numeric, alphanumeric, voice, or tone-only messages. Additionally, such pagers are typically equipped with means for alerting the pager user of a received message. To facilitate user control of the reviewing of messages and the alert means, a plurality of switches may be available.

Usually, upon receipt of a new message, the message is stored in a random access memory (RAM), and an initial audible, visual, or tactile alert is provided to inform the pager user that he has received a message. The audible, visual, and tactile alert means typically comprise an audio speaker, a light, and a vibrator, respectively. In the case of a numeric or alphanumeric display pager, the received message can be displayed on a visual display through actuation of a message reading switch, or, alternatively, the message can be displayed automatically upon receipt. In a typical voice pager, received messages can be reviewed via playback on the pager's audio speaker.

Most types of pagers in the current art are capable of at least two alert modes, commonly known as a silent alert mode and an audible alert mode. Each of these alert modes comprises a combination of the visual, audible, or tactile means. The silent alert mode typically comprises a visual alert and a tactile alert. Optionally, a very brief audible chirp may also be active in the silent alert mode to improve user recognition of received selective calls.

The audible alert mode typically comprises visual and audible alerts. The audible alert is usually at the maximum audio level of which the pager's audio speaker and audio drive circuitry are capable: typically 80 db sound pressure level (SPL) at 12 inches from the pager. In voice message pagers, a volume control is typically available for adjusting the level of the audible mode audio output.

The common method for switching between the silent alert mode and the audible alert mode comprises a user-accessible manual switch located on the exterior surface of the pager. When the pager user wishes to change alert modes, he manually selects the desired mode by utilizing the switch.

In both the silent and audible alert modes, upon receipt of a message, the initial alert is given for a predetermined amount of time (typically 8 to 20 seconds). Usually, the alert can be terminated immediately by user actuation of an alert reset switch. To improve user recognition of message receipt, especially in cases where the pager and user are separated for a period of time, most modern pagers comprise a means of reminding users of any messages stored in memory that have not been read. Typically, this means comprises a periodic alert similar to the initial alert given upon receipt of the page, but for a much shorter duration relative to the initial alert. The reminder alert usually repeats every two minutes until the received message is read.

In a known voice message pager with voice storage capability, message reception and storage in the audible mode is announced by the output of a brief audible alert of a predetermined pattern through an audio speaker, immediately followed by the output of the received voice message. In the silent mode, a vibrator is activated for a predetermined amount of time and a light is illuminated continously until the received voice message is recalled from memory and reviewed by playback through the audio speaker. Thus, in this case, the continuous illumination of the light serves as the message reminder.

A common design technique in current information pagers, particularly in numeric, alphanumeric, and tone-only pagers, is the combination of the alert reset and the message reading functions into one switch, known as the read/reset switch. If a new message is received and the initial alert is allowed to time out, the reminder alert is activated until the user actuates the read/reset switch, at which time the new message is displayed and the reminder alert is disabled. If a new message is received and the read/reset switch is actuated before the alert times out, the alert is immediately reset (terminated) and the reminder alert is activated until the read/reset switch is actuated again, thereby displaying the received message and disabling the reminder alert.

The current art in this area has a shortcoming in that the reminder-disabling is automatically performed upon message reading and, therefore, there is no provision for situations where the pager user desires to be periodically reminded of a stored message that has already been read. This deficiency is especially critical when a user is busy when he receives a message and he immediately reads the message upon receipt but is not able to act upon the message until later.

Thus, what is needed is an improved message reminder alert in a selective call receiver.

SUMMARY OF THE INVENTION

Accordingly, it is an object of the present invention to provide an improved message reminder alert in a selective call receiver.

In carrying out the above and other objects of the invention in one form, there is provided a method in an electronic device comprising the steps of: receiving a message, storing the message, providing an initial alert signal in response to the storing of the message, and providing a selectable periodic reminder alert signal for the message.

DETAILED DESCRIPTION OF THE INVENTION

Figure 1:
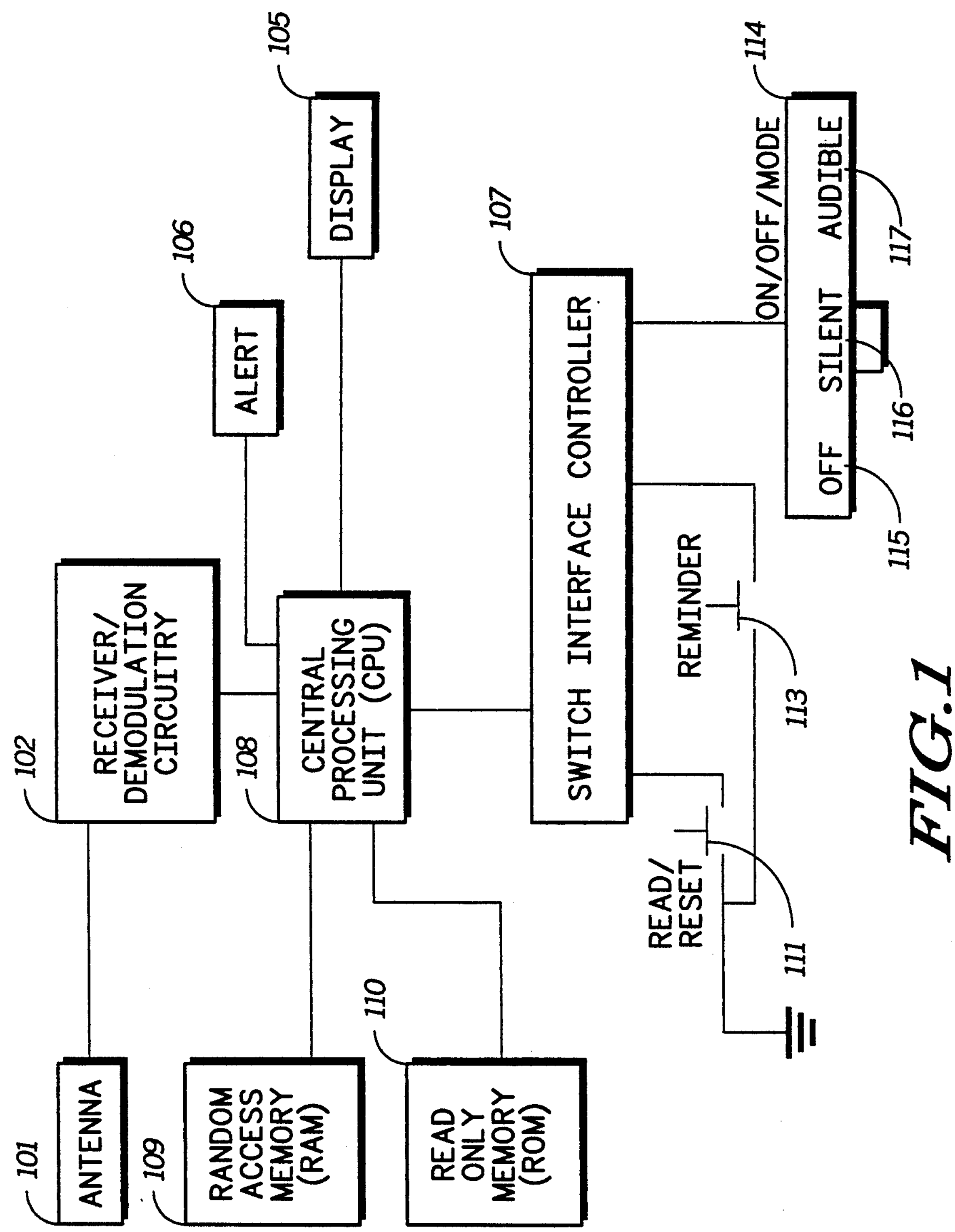
FIG. 1 is a block diagram of the selective call receiver of the preferred embodiment.

Referring to FIG. 1, a block diagram of the selective call receiver of the preferred embodiment comprises an antenna 101 for receiving radio frequency signals. The radio frequency signals are typically modulated by digital information comprised of: (a) a receiver address, and (b) a message. After receipt by the antenna 101, the modulated radio frequency signal is input to the receiver/demodulation circuitry 102, where the digital modulation is recovered. The receiver address portion of the recovered modulation is then input to the central processing unit (CPU) 108 where it is compared with the receiver addresses stored in the read only memory (ROM) 110. If there is a match between the recovered receiver address and any of the receiver addresses stored within the ROM 110, the recovered digital message is stored in the random access memory (RAM) 109 and the alert 106 is activated to provide an initial alert signal to inform the selective call receiver user of the received message.

The initial alert may comprise, for example, a visual, audible, or tactile means achieved through actuation of a light, speaker, or vibrating motor, respectively. The on/off/mode switch 114 is set by the user to the desired alert mode position. With the on/off/mode switch 114 in the off position 115, the selective call receiver is not operable and cannot receive any messages. In the silent position 116, the selective call receiver is in the silent mode in which messages can be received and the alert may be comprised of the visual and tactile means. Optionally, the silent mode alert may also comprise a very brief audible chirp. In the audible position 117, the selective call receiver is in the audible mode in which messages can be received and the alert may be comprised of the visual and audible means.

In both the silent and audible alert modes, the initial alert may time out after a predetermined amount of time. If the user immediately recognizes the initial alert, the read/reset switch 111 may be actuated in order to acknowledge the initial alert and reset it before time-out. In this case, a second actuation of the read/reset switch 111 will cause the newest (most recently received) message in the RAM 109 to be presented on an output means comprising the display 105. This second actuation of the read/reset switch thus comprises an acknowledgement by the user that he has read the message. Further actuations of the read/reset switch 111 will result in the successive output and presentation on the display 105 of stored messages in a new-to-old (last in-first out) order.

In the case where the initial alert is allowed to time out, the first actuation of the read/reset switch 111 (after time-out) will result in the display of the newest message in the RAM 109, thus comprising an acknowledgement by the user that the message has been read. Each repeated actuation of the read/reset switch 111 will cause the successive display of stored messages in a new-to-old (last in-first out) order.

Actuation of the reminder switch 113 will activate a reminder alert for a displayed message if the displayed message does not currently have the reminder alert active. Actuation of the reminder switch 113 will deactivate the reminder alert for a displayed message if the displayed message currently has the reminder alert active. A selectable reminder alert is thus available for each of the messages stored in the RAM 109. Alternatively, the reminder alert could be activated and deactivated by a switch actuation sequence involving the read/reset switch 111 and/or the on/off/mode switch 114. In this case, the reminder switch 113 could be eliminated.

The reminder alert may comprise a periodic very brief (relative to the initial alert duration) visual, audible, or tactile alert for the purpose of reminding the user to read or react to selected ones of the messages stored in the RAM 109. The exact period of the reminder alert may be predetermined and may be programmed into the ROM 110, or may be selectable by the user through a menu stored in the RAM 109 and selectively displayed on the display 105. Alternately, selective call receivers that have a real time clock (RTC) could have a means of setting the reminder alert to occur at (a) particular time(s) of day. After the initial brief visual, audible, or tactile reminder alert, the stored messages for which the reminder alert is active are displayed in new-to-old (last in-first out) order.

Once the reminder alert is activated for a particular message, it will continue at the selected period independent of the actuation of the read/reset switch 111 and independent of the receipt, storage, and alerting for subsequently received messages until it is deactivated by actuation of the reminder switch 113 while the particular message is displayed.

Alternatively, for a voice message pager with storage capability, the selectable message reminder could comprise brief activation of a visual, audible, or tactile alert. Immediately following the brief reminder alert, the messages for which the reminder alert is active would be played back in new-to-old (last in-first out) order. Similar to the foregoing case, the reminder alert could be selectively activated/deactivated for a particular message by actuation of the reminder switch 113 during the review of the message.

Figure 2:
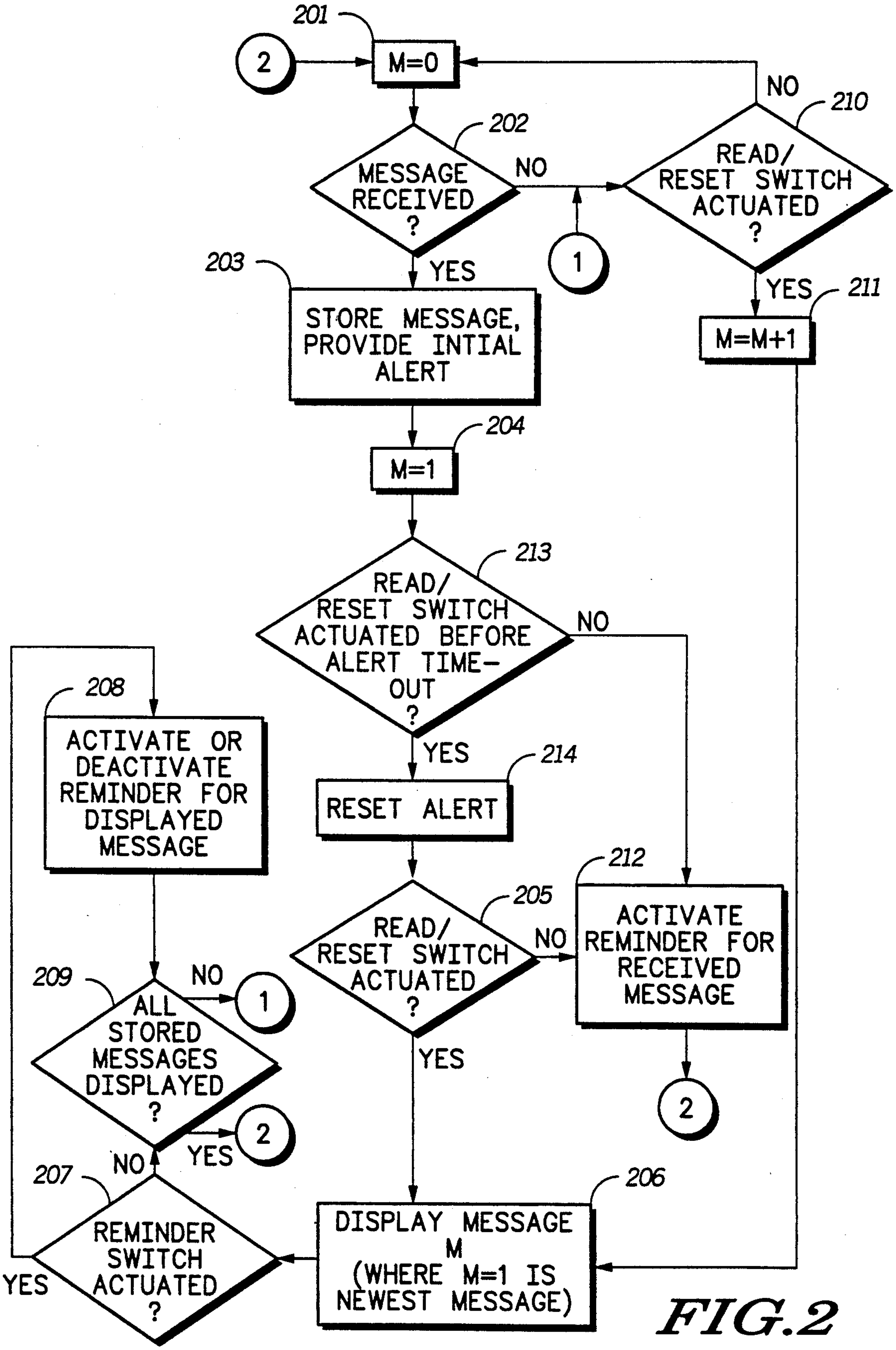
FIG. 2 is a flow diagram of the message reading and reminder alert selection processes of the preferred embodiment.

Referring to FIG. 2, a flow diagram of the message reading and reminder alert selection processes begins with a message counter represented by the letter "M" being set to zero, step 201, where M=1 represents the newest, most recently received message in memory. If no message is received in step 202, the process enters a loop comprised of steps 210, 201, and 202 which continues until a message is received or until the read/reset switch 111 is actuated. If a message is received in step 202, the message is stored in the RAM 109 and an initial alert is provided through the alert 106 in an alert mode determined by the setting of the on/off/mode switch 114, step 203. The message counter is then set to one, step 204, and a check is made to see if the read/reset switch 111 is actuated before alert time-out, step 213.

If the read/reset switch 111 is not actuated in step 213, the reminder alert is automatically activated for the received message, step 212, and the process reverts back to step 201. If the read/reset switch 111 is activated in step 213, the alert is reset, step 214, and the process proceeds to step 205 in which the read/reset switch is checked for actuation. If the read/reset switch 111 is not actuated in step 205, the reminder alert is automatically activated for the received message, step 212, and the process reverts back to step 201. If the read/reset switch is actuated in step 205, the reading of the message by the user is thus acknowledged and the process proceeds to step 206 where the Mth message is displayed on the display 105, which is, in this case, the M=1 (most recently received) message. The process then proceeds to step 207.

If the reminder switch is not actuated in step 207, the process proceeds directly to step 209, which comprises a check to see if all stored messages have been displayed. If it is found in step 209 that all of the stored messages have been displayed, the process reverts back to step 201. If it is found in step 209 that all of the stored messages have not been displayed, the process reverts back to step 210. If the read/reset switch 111 is not actuated in step 210, the process reverts back to step 201. If the read/reset switch 111 is actuated in step 210, the process proceeds to step 211, in which the message counter is incremented by one (i.e., M=M+1), and the process continues to step 206.

If the reminder switch 113 is actuated in step 207, the reminder alert is activated or deactivated for the currently displayed message, step 208. The reminder alert will be activated in step 208 for a displayed message that currently has the reminder alert inactive and the reminder alert will be deactivated in step 208 for a displayed message that currently has the reminder alert active. A selectable reminder alert for each of the messages stored in the RAM 109 is thus provided. The process then proceeds to step 209.

Figure 3:
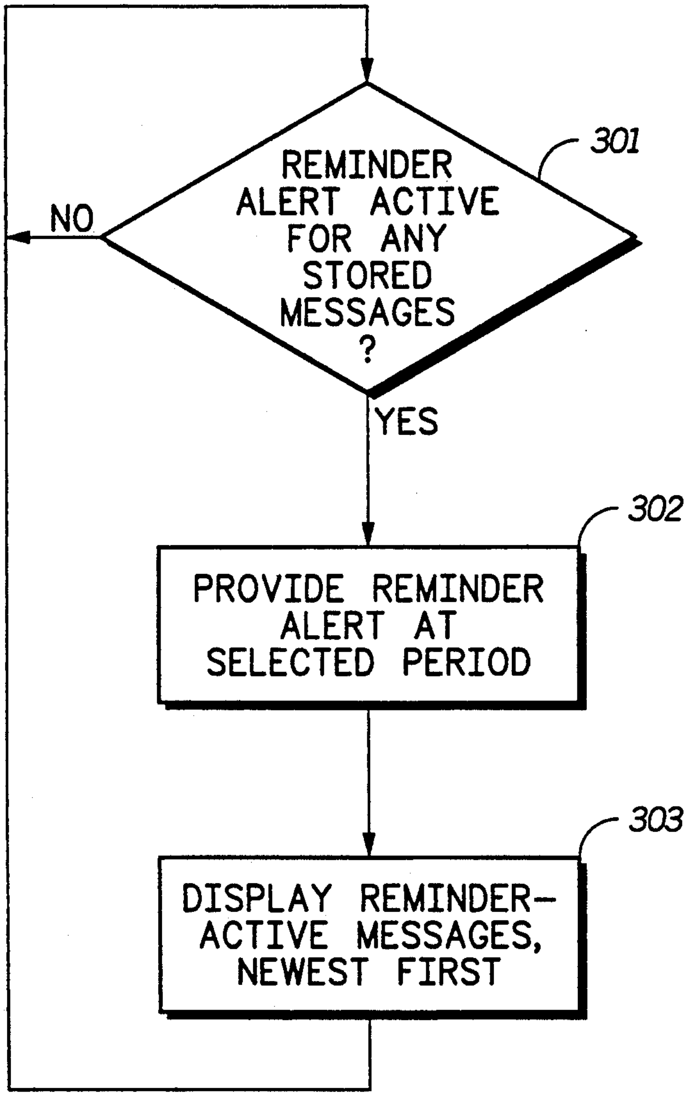
FIG. 3 is a flow diagram of the reminder alert process of the preferred embodiment.

Referring to FIG. 3, a flow diagram of the reminder alert process begins with a check to see if the reminder alert is active for any of the stored messages in the RAM 109, step 301. If the reminder alert is not active for any of the stored messages, the process remains at step 301. If, in step 301, it is found that the reminder alert is active for any of the stored messages, the process proceeds to step 302, in which a reminder alert is provided through the alert 106 at a period (or at specific times) that is selected as described in the foregoing. In step 303, immediately following the reminder alert, the stored messages with the reminder alert active are displayed successively in new-to-old order (last in-first out), and the process returns to step 301.

I claim:

1. A method in an electronic device having a user selectable control for activating and deactivating a reminder alert and an alerting device for providing a first alert signal and a second alert signal, said first alert signal being distinguishable from said second alert signal, said method comprising the steps of:
receiving a first message;
storing said first message;
providing said first alert signal in response to the said storing of said first message;
deactivating said first alert signal;
activating said reminder alert for said first message; and
providing said second alert signal for said first message in response to said activating of the reminder alert until the reminder alert is deactivated.

2. The method according to claim 1 wherein said electronic device comprises a selective call receiver.

3. The method according to claim 1 wherein said step of deactivating said first alert comprises displaying said first message.

4. The method according to claim 1 wherein said deactivating said first alert signal step comprises displaying said first message.

5. The method according to claim 1 wherein said activating step comprises the step of selecting a period for said second alert signal.

6. The method according to claim 1 wherein said activating step comprises presenting said first message on a display.

7. The method according to claim 1, said first message comprising a voice message.

8. The method according to claim 1 further comprising the steps of:
receiving a second message;
storing said second message; and
providing said first alert signal and said second alert signal, said first alert signal provided in response to said storing of said second message, said second alert signal provided for said first message independent of said first alert signal until the reminder alert for said first message is deactivated.

9. The method according to claim 8 further comprising the step of displaying said first message and said second message in a last in-first out order.

10. An electronic device comprising:
first means for receiving a message;
second means for storing said message;
third means for providing a first alert signal in response to said second means storing said message;
fourth means for user selectably activating and thereafter providing a second alert signal for said message; and
output means for presenting a message received alert in response to said first alert signal and for presenting a reminder alert in response to said second alert signal.

11. The electronic device according to claim 10, said electronic device comprising a selective call receiver.

12. The electronic device according to claim 10 further comprising fifth means for presenting said message.

13. The electronic device according to claim 12, said fifth means comprising a visual display.

14. The electronic device according to claim 10, said second alert signal having a selectable period.

15. The electronic device according to claim 12, said message comprising a voice message, wherein said fifth means comprises sixth means for audibly presenting said message.

16. An electronic device comprising:
storage means for storing a message;
output means for presenting said stored message;
alert means for providing a periodic alert for said stored message; and
user selectable control means for activating and deactivating said alert means, said periodic alert continuing if said user selectable control means has been activated even after said stored message has been presented by said output means.

17. The electronic device of claim 16, said electronic device comprising a selective call receiver.

18. The electronic device according to claim 16, said output means comprising a visual display.

19. The electronic device according to claim 16, said user selectable control means comprising a reminder switch.

20. A method in an electronic device having an output means for presenting a reminder alert signal, said method comprising the steps of:
receiving a plurality of messages;
storing each of said plurality of messages in one of a plurality of message storage slots;
activating a reminder alert for at least one of said plurality of messages; and
periodically presenting a reminder alert signal in response to said activating said reminder alert.

21. The method of claim 20 wherein said step of activating comprises the steps of:
presenting said at least one of said plurality of messages; and
activating a first user selectable control.

22. The method of claim 21 wherein said step of presenting comprises the step of activating a second user selectable control a predetermined number of times, said predetermined number determined by said plurality of messages stored and the message storage slot of said at least one of said plurality of messages.

23. The method of claim 20 further comprising the steps of:

deactivating said reminder alert for at least one of said plurality of messages; and not presenting said reminder alert signal if said reminder alert has been deactivated or not activated for all of said plurality of messages.

24. The method of claim 23 wherein said step of deactivating comprises the steps of:

presenting said at least one of said plurality of messages; and activating a first user selectable control.

25. The method of claim 24 wherein said step of activating comprises the steps of:

presenting said at least one of said plurality of messages; and activating said first user selectable control.

26. The method of claim 24 wherein said step of presenting comprises the step of activating a second user selectable control a predetermined number of times, said predetermined number determined by said plurality of messages stored and the message storage slot of said at least one of said plurality of messages.

27. The method of claim 25 wherein said step of presenting comprises the step of activating a second user selectable control a predetermined number of times, said predetermined number determined by said plurality of messages stored and the message storage slot of said at least one of said plurality of messages.

28. A selective call receiver comprising:

receiver means for receiving a plurality of messages;

storage means for storing each of said plurality of messages;

first alert means for generating a first alert in response to each of said plurality of messages being received;

first output means for presenting said plurality of messages;

first user selectable means for providing one of said plurality of messages from said storage means to said output means and for deactivating said first alert means in response to each of said plurality of messages having been provided to said first output means;

second user selectable means for activating and deactivating a reminder alert for each of said plurality of messages stored; and second alert means for generating a second alert in response to said second user selectable means being activated.

29. The selective call receiver of claim 28 further comprising a second output means coupled to said first and second alert means for presenting said first and second alerts.

30. The selective call receiver of claim 28 wherein said plurality of messages are voice messages and wherein said first output means is further coupled to said first and second alert means for presenting said first and second alerts.

31. The selective call receiver of claim 28 further comprising a third user selectable means for determining the period of said second alert.

* * * * *